United States Patent
Agarwal et al.

(10) Patent No.: US 9,714,321 B2
(45) Date of Patent: Jul. 25, 2017

(54) CONTINUOUS POLYMERIZATION PROCESS USING INTENSELY STIRRED VESSELS

(71) Applicant: Reliance Industries Limited, Mumbai (IN)

(72) Inventors: Uday Shankar Agarwal, Maharashtra (IN); Ved Prakash Mishra, Maharastra (IN); Krishna Srinivas Rao, Maharashtra (IN); Subbiah Venkatachalam, Maharashtra (IN); Rajiv Dixit, Maharashtra (IN); Ashwin Kumar Jain, Maharashtra (IN); Anil Krishna Kelkar, Maharashtra (IN)

(73) Assignee: RELIANCE INDUSTRIES LIMITED, Mumbai (IN)

( * ) Notice: Subject to any disclaimer, the term of this patent is extended or adjusted under 35 U.S.C. 154(b) by 0 days.

(21) Appl. No.: 13/748,367

(22) Filed: Jan. 23, 2013

(65) Prior Publication Data

US 2014/0031511 A1    Jan. 30, 2014

Related U.S. Application Data

(63) Continuation of application No. PCT/IN2011/000401, filed on Jun. 15, 2011.

(30) Foreign Application Priority Data

Jul. 23, 2010   (IN) .......................... 2099/MUM/2010

(51) Int. Cl.
  *C08G 63/78*   (2006.01)
  *C08G 63/688*  (2006.01)
  *D01F 6/62*    (2006.01)

(52) U.S. Cl.
  CPC ....... *C08G 63/785* (2013.01); *C08G 63/6886* (2013.01); *D01F 6/62* (2013.01)

(58) Field of Classification Search
  CPC ...... C08G 63/6886; C08G 63/785; D01F 6/62
  USPC ...... 528/272, 295, 308, 308.1; 424/134, 135
  See application file for complete search history.

(56) References Cited

U.S. PATENT DOCUMENTS

| | | | |
|---|---|---|---|
| 4,110,316 A | 8/1978 | Edging et al. | 526/68 |
| 5,559,205 A | 9/1996 | Hansen et al. | 528/279 |
| 6,075,115 A | 6/2000 | Putzig et al. | 528/279 |
| 6,096,838 A | 8/2000 | Nakamoto et al. | |
| 6,277,947 B1 | 8/2001 | Kelsey et al. | |
| 6,437,088 B1 * | 8/2002 | Duan | C08G 63/85 524/780 |
| 6,495,079 B1 | 12/2002 | Gallucci et al. | 264/78 |
| 6,706,852 B2 | 3/2004 | Duan et al. | |
| 6,707,852 B1 | 3/2004 | Wang | 375/240.12 |
| 7,087,706 B2 | 8/2006 | Caldwell | 528/272 |
| 2008/0125567 A1 * | 5/2008 | Ramaraju et al. | 528/302 |

FOREIGN PATENT DOCUMENTS

| | | |
|---|---|---|
| CN | 1548464 | 11/2004 |
| CN | 749293 | 3/2006 |
| EP | 1281725 A1 | 2/2003 |
| EP | 1862488 | 12/2007 |
| EP | 1939237 A1 | 7/2008 |
| JP | 58045971 | 10/1983 |
| JP | 62089725 | 4/1987 |
| JP | 62146921 | 6/1987 |
| JP | 2002284863 | 10/2002 |
| WO | WO-0200974 A1 | 1/2002 |

OTHER PUBLICATIONS

Rieckmann et al. "Poly(Ethylene Terephthalate) Polymerization—Mechanism, Catalysis, Kinetics, Mass Transfer and Reactor Design", Abstract, Chapter II of Modern Polyesters , p. 1; Jun. 2004.*
Rieckmann et al. "Poly(Ethylene Terephthalate) Polymerization—Mechanism, Catalysis, Kinetics, Mass Transfer and Reactor Design" Modern Polyesters, Chapter II, pp. 30-115, Jun. 2004—Article.*
Estes et al. "Fibers, 4. Synthetic Organic" , Abstract Jun. 2000.*
Estes et al. "Fibers, 4. Synthetic Organic" , Article Jun. 2000, pp. 1-98.*
Yamada "Effect of Titanium Dioxide on Direct Esterification between Terephthalic acid and Ethylene Glycol" , Journal of Applied Polymer Sci,V.45,pp. 765-781,1992.*
International Search Report and Written Opinion for PCT/IN2011/000401, mailed Dec. 1, 2011; ISA/CN.
John Scheirs and Timothy E. Long. Modern Polyesters—Chemistry and Technology in Polyesters and Copolyesters. John Wiley & Sons. ISBN: 0-471-49856-4, p. 259. 2003.

* cited by examiner

*Primary Examiner* — Ling Choi
*Assistant Examiner* — Gennadiy Mesh
(74) *Attorney, Agent, or Firm* — Harness, Dickey & Pierce, P.L.C.

(57) ABSTRACT

A continuous process for manufacturing a polyester includes introducing reactant components including a terephthalic acid slurry having an ethylene glycol to terephthalic acid molar ratio of about 2 and a $TiO_2$ slurry to an initial reactor vessel and stirring the reactant components at greater than 0 to 200 rpm to form an oligomer; transferring the oligomer, phosphoric acid, and at least one additive (carbon black, 5-sulfoisophthalic acid, 5-sulfoisophthalic acid dimethyl ester, and/or 5-sulfoisophthalic acid diglycolate) to an intermittent reactor vessel and stirring at 400 rpm to 1000 rpm to form an intermediate, wherein the oligomer, the at least one additive, and the phosphoric acid have a residence time of from 1 minute to 5 minutes in the intermittent vessel; and polymerizing the intermediate in a final reactor vessel at a temperature of 285° C. to 320° C., and in the absence of a polyethylene glycol, to obtain the polyester.

7 Claims, No Drawings

CONTINUOUS POLYMERIZATION PROCESS USING INTENSELY STIRRED VESSELS

CROSS-REFERENCE TO RELATED APPLICATIONS

This application is a continuation application of PCT Application No. PCT/IN2011/000401 filed on Jun. 15, 2011, which claims the benefit of Indian Patent Application No. 2099/MUM/2010 filed on Jul. 23, 2010. The entire disclosures of each of the above applications are incorporated herein by reference.

FIELD OF THE INVENTION

The present invention relates to polymerization processes for the manufacture of condensation polymer, yarn and other products.

BACKGROUND OF THE INVENTION

Traditionally, batch processes have been used for continuous polymerization in the manufacturing of yarn and other products which are costly and time consuming, as well as lack in product uniformity. For example there is viscosity variation from batch to batch and also during polymer extrusion from the reactor into strands, leading to poor spinning, also leading to high pressure rise across the filters in the polymer lines and spinning packs, high spinning breaks per tonne and poor post processing performance (broken filaments on textured bobbins). Some methods do mention use of a continuous process with different variations such as the use of additives with the accompanying polymerization temperature, spin pack pressure, less uniformity and higher filament breakage rate.

Cationic dyeable polyester (PET) has been conventionally made by introducing (during polymerization) as a comonomer a) the sodium salt of 5, sulfoisophthalic acid dimethyl ester (abbreviated SIPM)

or b) in case of PTA process for PET, after transesterification (catalyzed by sodium acetate etc) of SIPM with excess ethylene glycol to the sodium salt of 5, sulfoisophthalic acid diglycolate (abbreviated SIPE or SIPEG)

JP 2002-284863 suggests that SIPEG (or SIPM) charge may give a gel with high acid groups in PTA slurry and cationic dyeable polyester PTA route is more complex. (DMT or PTA route)

U.S. Pat. No. 6,706,852 suggests that to provide increased compatibility with the glycol end-group carrying oligomer (such as BHET) in the PTA route, transesterification of SIPM with MEG to SIPEG is carried out in the PTA route.

Fully or part conversion from SIPM to SIPEG is recommended by some. JP 2002-284863 and EP 1862488 recommend full conversion; U.S. Pat. No. 6,706,852 recommends part conversion to address the issue of solution stability (vs. crystallization-precipitation).

High concentration of SIPEG in MEG is desired to reduce MEG removal load on the polymerization reactor and to reduce recycle of the excess solvent in the process. U.S. Pat. No. 6,706,852 suggested that fully converted SIPEG solution is not stable at high concentration (40% or higher) at room temperature. Therefore it needs to be prepared (i.e. SIPM to SIPEG conversion) immediately before use in polymerization. Else, either a lower concentration of less than 20% should be employed, or a partial conversion to SIPEG should be adopted.

Also point of addition of TiO2 and SIPM/SIPEG, due to the anticipated interaction between the two plays an important role in the reaction. Section [0019] of JP 2002-284863 suggests that the SIPEG charge may give gel with high acid groups in slurry, hence better add later in reaction when carboxylic acid concentration has fallen. JP 2002-284863 suggests feeding SIPEG in slurry. Similarly, EP 1862488 talks about various modes, but section [0043], [0048] and [0057] there suggest preference for addition to slurry. However, that does require adjustment of pH of the slurry. JP 2002-284863 and EP1862488 suggest TiO2 addition in slurry immediately after SIPEG. U.S. Pat. No. 6,706,852 also recommend TiO2 addition immediately following SIPEG, but in oligomer from PTA. U.S. Pat. No. 5,559,205 instead recommends TiO2 addition to oligomer, and before SIPEG, to avoid agglomeration of TiO2.

Also, the MEG to PTA mole ratio is critical for good spinning. of JP 2002-284863 and the EP 1862488 suggest use of MEG not exceeding 1.2 to avoid excess DEG to avoid spinning problems in continuous polymerization.

JP 2002-284863 and [0051] in EP 1862488 suggest solving the problem of high viscosity/thickening (resulting from aggregation of ionic/charged parts of SIPEG, and deteriorating spinning/giving gelling) with addition of PEG. [0035] of this patent says only 280 deg C. is used. EP1862488 under [0030] also mentions that PEG reduces heat resistance of polyester, and reduces color tone. EP1862488, under [0057] item 5 sets temp not higher than 280 deg C. Also [0010] of EP 1862488, it introduces the additional problem that "darkcolor light fastness" becomes unsatisfactory (because PEG introduces somewhat 'open' structure in fiber). This EP 1862488 also claims dyeability at low temp/normal pressure, essentially because of the PEG, a well known effect. JP 2002-284863 under [0025] also suggests that PEG introduces undesirable foaming possibility during polymerization.

Batch processes as disclosed in the U.S. Pat. No. 6,706,852, employ agitated vessel for carrying out polymerization with SIPM/SIPEG. But polyester manufacturing in large continuous plants has largely moved to reducing/eliminating moving parts (such as agitators) in reactors, particularly the esterifier and prepolymerizer, in an effort to reduce process costs (CAPEX and OPEX). U.S. Pat. No. 5,559,205 suggests additive addition is generally carried out in 'oligomer line' leading from esterifier to prepolymerizer U.S. Pat. No. 5,559,205 mentioned need for TiO2 to be well-mixed in oligomer without mentioning how to achieve this as they only 'metered-in' the slurry, perhaps with some static mixers, but the later addition of SIPEG simply by 'metering-in' into the oligomer line. No mention of need for particularly good dispersion of TiO2 in the TiO2-MEG slurry itself prior to addition to the PTA-MEG slurry.

Also in U.S. Pat. Nos. 6,706,852 and 6,075,115, it is common knowledge to use phosphoric acid or another phosphorus compound in process using SIPEG is to control the polymer discoloration, particularly when using Ti catalyst as it slows down the catalytic activity of Ti. It teaches that sometimes $H_3PO_4$ is not effective and other polymers may perform better. In another application JP 2001-086169 of Kanebo Synthetic Fibers Ltd, discloses a method for producing atmospheric cationic dyable polyester. It suggests an improvement over existing methods but has many drawbacks such as the spinning operatibility is remarkably bad, light fastness is inferior and the degree of polymerization is low.

JP58-45971B and JP62-89725 disclose batch polymerization methods. If a batch type manufacturing method is used it will extrude by aging of polymer extrusion, will extrude with the polymer viscosity at the time of a start and a difference will arise in the polymer viscosity at the time of the end. When the number of batches increased, there was a problem that the foreign matter in which residual polymer in an iron pot deteriorated mixed or the polymer property difference between the batches became large. Hence the problem of productive efficiency remains with batch processes.

JP62-146921A suggests a method of extracting oligomer after the end of esterification, leading to another polymerization tank, using continuous polymerization method directly as the above-mentioned measure and manufacturing by the batch type polymerizing method. Since the polymerization reaction serves as a batch method, there are spots of polymer physical properties and there is also a problem that equipment becomes complicated. It also suggests use of additive like PEG which limits polymerization temperature to 285 deg C. Similarly [0030] of EP 1862488 suggests that PEG reduces heat resistance and color tone of polyester and EG:PTA mole ratio of 1.1-1.2. This gives remarkably bad spinning operatibility. [0058] of EP1862488 suggests need of light resistant and heat resistant agents. Also spinning breakage rate is remarkably higher in this art.

U.S. Pat. No. 5,559,205 discloses a process for adding fully esterifted bis(2-hydroxyethyl) sodium 5 sulfoisophthalate (Na-SIPEG) or bis(2-hydroxyethyl) lithium 5-sulfoisophthalate (Li-SIPEG) to the monomer line of DMT process, or oligomer line or the second esterifier of TPA process to make cationic dyeable polyesters. This patent does not allow addition of $TiO_2$ in slurry and do not specify need of addition of SIPEG into oligomer. SIPEG is added after $TiO_2$ addition. Also no reference is made about "continuous process" thus limiting the performance.

U.S. Pat. No. 6,075,115 discloses a process for making Na-SIPEG solution and Li-SIPEG solution from sodium 5-sulfoisophthalic acid (Na-SIPA) and lithium 5-sulfoisophthalic acid (Li-SIPA) powder. In order to fully esterify Na-SIPA and Li-SIPA, a special titanium catalyst is used, which comprises (1) a titanium compound, a solubility promoter, a phosphorus source, and optionally a solvent or (2) a titanium compound, a complexing agent, a phosphorus source and optionally a solvent, a sulfonic acid. The fully esterified Na-SIPEG and Li-SIPEG solutions were manufactured by a vendor and then shipped to polyester producers. The solution was then injected into the monomer line of DMT process or oligomer line or the second esterifier of TPA process or the second or third vessel of batch polymerization process to make copolyesters. A metal salt of 5-sulfoisophthalic acid fully esterified with methanol is also commercially available. This process makes no mention of continuous process or injection into oligomer line. Also batch process is employed here and $TiO_2$ is not added in slurry. Also problems of spinning are evident. Hence there is long standing need for faster continuous method of polymerization.

Patent No. U.S. Pat. Nos. 7,087,706 and 4,110,316 suggest use of static mixers in the transfer line for mixing of additives while agitated mixing equipments are generally avoided in order to eliminate chance of process disturbances. However, the chances of gel formation are higher in such vessels. This problem is not addressed by existing methods.

STATEMENT OF THE INVENTION

A continuous polymerization process wherein a plurality of stirred vessels(intermittent reactor vessels) are employed in oligomer transfer line and least one additive is charged in slurry or solution or as reacted with at least one of the monomers through the stirred vessel. Addition of further additive depends on the kind of reaction and final product.

The polymerization temperature is 285 deg C. or above. The stirring speed inside the vessel is about 400 to 1000 rpm. The yarn obtained from this process has higher uniformity and filament breakage rate during melt spinning is considerably reduced.

SUMMARY OF THE INVENTION

In accordance with the present invention there is provided a continuous polymerization process for manufacturing a condensation polymer; said process comprising the following steps:
  a. employing an assembly comprising at least one initial reactor vessel, at least one final reactor vessel and optionally at least one intermittent reactor vessel;
  b. connecting said reactor vessels to each other through one or more transfer lines for leading the reactive materials from one vessel to another;
  c. adding the reactant components to at least one of the initial reactor vessels;
  d. optionally adding additives to any of said reactor vessels or in the transfer lines;
  e. stirring the reactive materials relatively vigorously in the intermittent reactor vessel after the addition of the additives;
  f. optionally stirring the reactive materials relatively mildly in the initial reactor vessel;
  g. obtaining intermediates from at least one of the intermittent reactor vessel; and
  h. obtaining reaction products from the final reactor vessel.

Typically, the polymerization is carried out at a temperature not lower than 285 deg C.

Typically, the step of vigorous stirring is carried out at a speed of about 400 to about 1000 rpm.

Typically, the step of vigorous stirring is carried out for a period less than 10 minutes, preferably less than 5 minutes.

Typically, the step of mild stirring is carried out at a speed less than 200 rpm.

Typically, the condensation polymer is polyester.

Typically, the additive is carbon black with a particle size within the range of about 0.02 to about 1 microns.

Typically, the additive is a co-monomer containing a sulphonic acid group and which is capable of attaching to a cationic dye.

Typically, the co-monomer is at least one selected from the group consisting of 5-sulfoisophthalic acid (SIPA), 5-sulfoisophthalic acid dimethyl ester (SIPM), 5-sulfoisophthalic acid diglycolate (SIPEG) and alkali metal salts thereof.

In accordance with another aspect of the present invention there is provided a condensation polymer made from said continuous polymerization process.

In accordance with still another aspect of the present invention there is provided a yarn having filament breakage less than about 20 to about 30% made from said continuous polymerization process of any of the preceding claims.

In accordance with yet another aspect of the present invention there is provided a process for making a yarn from a condensation polymer wherein the spin pack pressure rise rate is attenuated by about 25 to about 35%.

In accordance with another aspect of the present invention there is provided a system for carrying out the continuous polymerization process comprising:
a. at least one initial reactor vessel;
b. at least one final reactor vessel;
c. optionally at least one intermittent reactor vessel;
d. transfer lines for connecting the reactor vessels; and
e. vigorous stirring means fitted in at least one of the intermittent reactor vessel.

Typically, the system further comprises mild stirring means fitted in at least one of the initial reactor vessels.

The process in accordance with the present invention includes employing plurality of stirred vessels (intermittent reactor vessels) in oligomer transfer line where least one additive is charged in slurry or solution through the stirring vessel. The vessel provides reactants residence time of less than ten minutes preferably less than five minutes. Any further vessels employed provide higher residence time proportionate to output. Use of such vessels in reactor system is independent of the any further additives. The Stirring vessel in the transfer line reduces chance of gel formation without necessitating use of diluents.

DETAILED DESCRIPTION OF THE INVENTION

The foregoing description of the specific embodiments will so fully reveal the general nature of the embodiments herein that others can, by applying current knowledge, readily modify and/or adapt for various applications such specific embodiments without departing from the generic concept and therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

As used herein, "Small" vessel is small relative to the large un-stirred or less stirred reactors. "Small" is to be quantified as that size in a given throughput which provides less than 10 minute residence time, preferably less than 5 minute, while sizes of other bigger vessels/reactors in the line with same throughput will be proportionate with the higher residence times as chosen.

As used herein, the term "Vigorously" stirred vessel means wherein the stirring speed of vessel is about 400 to about 1000 rpm.

As used herein, the term "Additive" includes all possible additives which may or may not react with monomer.

In accordance with the present invention there is provided a continuous polymerization process for manufacturing a condensation polymer. The process comprising the following steps:

First step is employing an assembly comprising at least one initial reactor vessel, at least one final reactor vessel and optionally at least one intermittent reactor vessel.

Second step is connecting said reactor vessels to each other through one or more transfer lines for leading the reactive materials from one vessel to another.

Third step is adding the reactant components to at least one of the initial reactor vessels.

Fourth step is optionally adding additives to any of said reactor vessels or in the transfer lines.

Fifth step is stirring the reactive materials relatively vigorously in the intermittent reactor vessel after the addition of the additives.

Typically, the step of vigorous stirring is carried out at a speed of about 400 to about 1000 rpm for a period less than 10 minutes, preferably less than 5 minutes.

Next step is optionally stirring the reactive materials relatively mildly in the initial reactor vessel.

Typically, the step of mild stirring is carried out at a speed less than 200 rpm.

Finally the intermediates are obtained from at least one of the intermittent reactor vessel and the reaction product is obtained from the final reactor vessel.

In accordance with the present invention the polymerization is carried out at a temperature not lower than 285 deg C.

The additive used in the polymerization process in accordance with the present invention is carbon black with a particle size within the range of about 0.02 to about 1 microns.

In accordance with another embodiment of the present invention the additive is a co-monomer containing a sulphonic acid group and which is capable of attaching to a cationic dye.

The co-monomer employed is at least one selected from the group consisting of 5-sulfoisophthalic acid (SIPA), 5-sulfoisophthalic acid dimethyl ester (SIPM), 5-sulfoisophthalic acid diglycolate (SIPEG) and alkali metal salts thereof.

In accordance with another aspect of the present invention there is provided a condensation polymer made from said continuous polymerization process.

Typically, the condensation polymer is polyester.

In accordance with still another aspect of the present invention there is provided a yarn having filament breakage less than about 20 to about 30% made from said continuous polymerization process of any of the preceding claims.

In accordance with yet another aspect of the present invention there is provided a process for making a yarn from a condensation polymer wherein the spin pack pressure rise rate is attenuated by about 25 to about 35%.

In accordance with another aspect of the present invention there is provided a system for carrying out the continuous polymerization process comprising:
a. at least one initial reactor vessel;
b. at least one final reactor vessel;
c. optionally at least one intermittent reactor vessel;
d. transfer lines for connecting the reactor vessels; and
e. vigorous stirring means fitted in at least one of the intermittent reactor vessel.

Typically, the system further comprises mild stirring means fitted in at least one of the initial reactor vessels.

According to present invention, at least one vigorously stirred vessel (intermittent reactor vessel) is employed in a polymerization line that is otherwise devoid of reactors, to allow injection of additive solution in the oligomer while it is undergoing intense mixing. It works by immediate dispersion of the fluid additive into the oligomer, before the heat transfer from oligomer to additive droplet can cause freezing of oligomer at the interface of the additive fluid droplets. The stirring speed of vessel is about 400 to about 1000 rpm. Reduction in the rate of pressure rise up to 25% and reduction in the rate of broken filament during melt spinning up to 20% is achieved due to uniformity in the product obtained by such mixing. This vessel eliminates need of any other moving parts in reactor and reduces expenditure.

In one of the preferred embodiments a continuous polymerization process is provided to manufacture a semi-dull cationic dyeable polyalkylene terephthalate. Particularly, a continuous polymerization process to manufacture a semi-dull cationic dyeable polyalkylene terephthalate where alkali metal salt of 5-sulfoisophthalic acid dimethyl ester is converted to an alkali metal salt of 5-sulfoisophthalic acid diglycolate through a tranesterification reaction in at least one of an excess alkylene glycol is provided. Reduction in the rate of pressure rise during melt spinning, as well as reduction in broken filaments of textured yarn, is achieved while using cationic dyeable polyester is made in a continuous process that employs additive injection into oligomer in a stirred vessel.

Then the additive such as $TiO_2$ slurry in a glycol is added into a purified terephthalic acid (PTA) slurry in at least one glycol or into an oligomer formed. Here, $TiO_2$ is added first to the purified terephthalic acid slurry followed by addition of alkali metal salt of 5-sulfoisophthalic acid diglycolate to said oligomer after the transesterification. The mole ratio of alkylene glycol to purified terephthalic acid is around 2. An especially fine dispersion of PTA-MEG slurry (obtained through an otherwise known centrifugal separation/recirculating system) being added to PTA-MEG slurry, 20% converted SIPEG solution addition to molten oligomer undergoing intense mixing in highly agitated vessel in the continuous polymerization line.

About 15% to 45% of converted solution of alkali metal salt of 5-sulfoisophthalic acid diglycolate is injected into a oligomer transferline, alkali metal salt of 5-sulfoisophthalic acid diglycolate undergoes mixing with oligomer in a stirring vessel placed within oligomer transfer line. About 10 to 100 ppm of phosphoric acid is added in the oligomer transfer line. Use of phosphoric acid eliminates need of other additives like PEG. Elimination of addition of PEG which is thermally sensitive, thereby enabling the use of higher polymerization temp (~295° C.) and hence provides higher productivity. The stirring speed inside the vessel may be about 400 to about 1000 rpm.

In another aspect polyalkylene terephthalate yarn made from a semi-dull cationic dyeable polyalkylene terephthalate is provided. The cationic dyeable polyalkylene terephthalate is manufactured through a continuous polymerization process, the process including: converting a alkali metal salt of 5-sulfoisophthalic acid dimethyl ester to a alkali metal salt of 5-sulfoisophthalic acid diglycolate through a transesterification reaction in at least one of excess alkylene glycol; adding additive slurry in a glycol into a purified terephthalic acid (PTA) slurry in at least one glycol or into an oligomer formed therefrom; injecting about 15% to 45% of converted solution of the alkali metal salt of 5-sulfoisophthalic acid diglycolate into a oligomer transferline wherein the alkali metal salt of 5-sulfoisophthalic acid diglycolate undergoes mixing with the oligomer in a stirring vessel placed within the oligomer transfer line.

In other possible embodiment, there can be additives which do not react with the monomer and hence do not convert into such a derivative as the glycolate but only remain soluble.

In a further possible embodiment, there can also be additives which neither react nor dissolve in the monomer but some complex or may even remain as neutral slurry and added through the stirred vessel.

In accordance with the preferred embodiment of the present invention carbon black slurry and small part of mono-ethylene glycol are added to oligomer at 290 deg C. in the small vessel at 400-1000 rpm vessel speed. This gives fine dispersion in high shear zone of stirred vessel by breaking the drop into small particles.

In further embodiment, a cationic dyeable polyester manufactured using vigorously stirred small vessel is provided where spin pack pressure rise of only 5 Bars/day for POY 128/72 is required and filament breakage is reduced to 10 per bobbin.

While considerable emphasis has been placed herein on the specific features of the preferred embodiment, it will be appreciated that many additional features can be added and that many changes can be made in the preferred embodiment without departing from the principles of the invention. These and other changes in the preferred embodiment of the invention will be apparent to those skilled in the art from the disclosure herein, whereby it is to be distinctly understood that the foregoing descriptive matter is to be interpreted merely as illustrative of the invention and not as a limitation.

The invention claimed is:

1. A continuous polymerization process for manufacturing a polyester, the process comprising the following steps:
   a) employing an assembly comprising an initial reactor vessel, a final reactor vessel and an intermittent reactor vessel, where said reactor vessels are connected to each other through one or more transfer lines;
   b) introducing reactant components comprising a terephthalic acid slurry comprising terephthalic acid and ethylene glycol and a $TiO_2$ slurry comprising $TiO_2$ and ethylene glycol to the initial reactor vessel, wherein the terephthalic acid slurry has as ethylene glycol to terephthalic acid molar ratio of about 2;
   c) stirring the reactant components in the initial reactor vessel at a speed of greater than 0 to less than 200 rpm to form an oligomer;
   d) transferring the oligomer produced in the initial reactor to the intermittent reactor vessel and stirring the oligomer in the intermittent reactor vessel at a speed ranging from 400 rpm to 1000 rpm;
   e) introducing about 10 ppm to 100 ppm phosphoric acid and at least one additive selected from carbon black having a particle size of about 0.02 μm to about 1 μm or a member of the group consisting of 5-sulfoisophthalic acid (SIPA), 5-sulfoisophthalic acid dimethyl ester (SIPM), 5-sulfoisophthalic acid diglycolate (SIPEG), and alkali metal salts thereof to the oligomer being stirred at 400 rpm to 1000 rpm in the intermittent reactor vessel, wherein the at least one additive is blended into the oligomer and an intermediate is obtained, and wherein the oligomer, the at least one additive, and the phosphoric acid have a residence time of from 1 minute to 5 minutes in the intermittent vessel;
   f) transferring the intermediate to the final reactor vessel; and
   g) polymerizing the intermediate in the final reactor vessel at a temperature of from 285° C. to 320° C. and in the absence of a polyethylene glycol, to obtain the polyester.

2. The process as claimed in claim 1, wherein the polyester is a cationic dyeable polyalkylene terephthalate.

3. The process as claimed in claim 1, further comprising spinning the polyester into a yarn with a filament breakage of less than about 30%.

4. A continuous polymerization process for manufacturing a polyester, the process comprising the following steps:
   a) employing an assembly comprising an initial reactor vessel, a final reactor vessel and an intermittent reactor vessel, where said reactor vessels are connected to each other through one or more transfer lines;
   b) introducing reactant components comprising a terephthalic acid slurry comprising terephthalic acid and ethylene glycol and a $TiO_2$ slurry comprising $TiO_2$ and ethylene glycol to the initial reactor vessel, wherein the terephthalic acid slurry has an ethylene glycol to terephthalic acid molar ratio of about 2;
   c) stirring the reactant components in the initial reactor vessel at a speed of greater than 0 to less than 200 rpm to form an oligomer;
   d) transferring the oligomer produced in the initial reactor to the intermittent reactor vessel and stirring the oligomer in the intermittent reactor vessel at a speed ranging from 400 rpm to 1000 rpm;
   e) introducing a solution comprising 15% to 45% by weight 5-sulfoisophthalic acid diglycolate (SIPEG), and about 10 ppm to 100 ppm phosphoric acid to the oligomer being stirred at 400 rpm to 1000 rpm in the intermittent reactor vessel, wherein the SIPEG is blended into the oligomer and an intermediate is obtained, and wherein the oligomer, the SIPEG, and the phosphoric acid have a residence time of from 1 minute to 5 minutes in the intermittent vessel;
   f) transferring the intermediate to the final reactor vessel; and
   g) polymerizing the intermediate in the final reactor vessel at a temperature of from 285° C. to 320° C., and in the absence of a polyethylene glycol, to obtain the polyester.

5. The process as claimed in claim 4, wherein the SIPEG is generated from a transesterification reaction between 5-sulfoisophthalic acid dimethyl ester (SIPM) and ethylene glycol.

6. The process as claimed in claim 1, wherein the phosphoric acid and the at least one additive are introduced to the intermittent reactor vessel either through a transfer line connecting the initial reactor to the intermittent reactor vessel or directly to the intermittent vessel, wherein the oligomer is being stirred in the intermittent reactor vessel.

7. The continuous polymerization process for manufacturing polyester as claimed in claim 4, wherein the solution comprising SIPEG, and the phosphoric acid are introduced to the intermittent reactor vessel either through a transfer line connecting the initial reactor to the intermittent reactor vessel or directly to the intermittent vessel, wherein the oligomer is being stirred in the intermittent reactor vessel.

* * * * *